(12) United States Patent
Alva et al.

(10) Patent No.: US 8,701,033 B2
(45) Date of Patent: Apr. 15, 2014

(54) ELECTRONIC INDEXING FOR PRINTED MEDIA

(75) Inventors: Carlos O. Alva, Penfield, NY (US); Russell A. Coleman, West Henrietta, NY (US)

(73) Assignee: Xerox Corporation, Norwalk, CT (US)

(*) Notice: Subject to any disclaimer, the term of this patent is extended or adjusted under 35 U.S.C. 154(b) by 867 days.

(21) Appl. No.: 12/141,536

(22) Filed: Jun. 18, 2008

(65) Prior Publication Data
US 2009/0319936 A1 Dec. 24, 2009

(51) Int. Cl.
*G06F 3/048* (2013.01)

(52) U.S. Cl.
USPC .......................................................... 715/776

(58) Field of Classification Search
None
See application file for complete search history.

(56) References Cited

U.S. PATENT DOCUMENTS

| | | | |
|---|---|---|---|
| 5,392,387 A | | 2/1995 | Fitzpatrick et al. |
| 5,496,071 A * | | 3/1996 | Walsh ............................ 283/70 |
| 5,517,407 A * | | 5/1996 | Weiner ............................ 704/1 |
| 6,092,090 A * | | 7/2000 | Payne et al. .................. 715/234 |
| 6,266,657 B1 * | | 7/2001 | deVries et al. ................ 707/741 |
| 6,549,660 B1 * | | 4/2003 | Lipson et al. ................. 382/224 |
| 6,571,054 B1 * | | 5/2003 | Tonomura et al. ............ 386/241 |
| 7,484,172 B2 * | | 1/2009 | Walker et al. ................. 715/207 |
| 7,487,181 B2 * | | 2/2009 | Lakshminarayanan et al. ...... 1/1 |
| 7,573,598 B2 * | | 8/2009 | Cragun et al. ................ 358/1.18 |
| 7,603,106 B2 * | | 10/2009 | Aaltonen et al. ............. 455/412.1 |
| 7,698,236 B2 * | | 4/2010 | Cox et al. ....................... 706/12 |
| 2004/0261016 A1 * | | 12/2004 | Glass et al. .................... 715/512 |
| 2005/0004885 A1 * | | 1/2005 | Pandian et al. .................. 707/1 |
| 2005/0096938 A1 | | 5/2005 | Slomkowski et al. |
| 2006/0287919 A1 * | | 12/2006 | Rubens et al. .................. 705/14 |
| 2007/0250901 A1 * | | 10/2007 | McIntire et al. .............. 725/146 |
| 2008/0109407 A1 | | 5/2008 | Kirkland et al. |

OTHER PUBLICATIONS

"A hypertext electronic index based on the Grif structured document editor", Helene Richy. vol. 7, Mar. 21-34, 1994, http://cajun.cs.nott.ac.uk/compsci/epo/papers/volume7/issue1/ep077hr.pdf.*

* cited by examiner

*Primary Examiner* — Neveen Abel Jalil
*Assistant Examiner* — Kellye Buckingham
(74) *Attorney, Agent, or Firm* — Gibb & Riley, LLC

(57) ABSTRACT

A method supplies or creates a generic electronic index for a hardcopy printed item. The generic electronic index is based on the text within the hardcopy printed item. From this generic electronic index, the method creates a plurality of custom electronic indices from the generic electronic index. Such custom electronic indices can be based on user input and/or user feedback or can be created by marketing agencies, educational institutions, etc. Each of the custom electronic indices is a variant of the generic electronic index, and each of the custom electronic indices is adapted to a different target audience.

17 Claims, 3 Drawing Sheets

ELECTRONIC INDEXING FOR PRINTED MEDIA

BACKGROUND AND SUMMARY

Embodiments herein generally relate to electronic indices for hardcopy items, and more particularly to a method that creates customized indices for such hardcopy items that are more useful than generic electronic indices.

As explained in U.S. Patent Publications 2005/0096938 and 2008/0109407 (the complete disclosures of which are incorporated herein by reference) conventional reference books typically include an index, which is a detailed list of the information included in the book. An index thus increases the ease with which a user can locate information within a book. Although reference books often contain indices, the quality of the index is at the discretion of the publisher. Other types of books, such as fiction, typically do not contain indexes. In these cases, it is difficult for a reader to locate particular information or passages within the book.

Reading on-line in various forms has proliferated because of the Internet. Technologies such as electronic book readers have been introduced in the last few years. However, conventional e-books require a user to have access to a PC or CDROM, which limits the flexibility of the user to utilize an e-book in different locations where a PC or CDROM may not be available.

In addition, paper is a versatile technology that is flexible, durable, cheap, and ubiquitous. Words and images can be stored on it using pens, brushes, crayons, typewriters, or ink-jet printers. It is easy to share. Paper works well even if dropped, folded, left out in the sun/rain, etc.

Because paper hardcopy materials (hardbound books, paperback books, magazines, periodicals, etc.) are so useful and popular (but their indices are static and difficult to access) the embodiments herein create customized indices for such hardcopy items that can be used with any computerized portable devices ranging from cell phones, PDAs, PC, etc. The embodiments herein use variable indexing configurations ranging from the book on hand to user defined indices (including indices for magazines and other hardcopy publications). This custom indexing can modify the custom indices to include embedded objects (e.g., pictures) illustrating concepts and other graphics (including marketing items and advertisements) and to include hyperlinks to other documents and websites. The custom indices generated expand from a book to any printed material. For instance in the case of a magazine, the accompanying custom electronic index can include graphical advertising and hyperlinks to various documents and web sites.

Moreover, the embodiments herein expand to custom indices created by any user, or based on user feedback/input. With embodiments herein, any user can create a collaboration environment where the custom electronic indices can be refined, appended, or corrected creating more efficient and a more complete source of information, in addition to the ability to embed objects.

One method embodiment herein begins by creating a generic electronic index for a hardcopy printed item. The generic electronic index is based on the text within the hardcopy printed item. From this generic electronic index, the method creates a plurality of custom electronic indices. Such custom electronic indices can be based on user input and/or user feedback or can be created by marketing agencies, educational institutions, etc. Each of the custom electronic indices is a variant of the generic electronic index, and each of the custom electronic indices is adapted to a different target audience.

After the custom electronic indices are created, the method stores the custom electronic indices on a computerized server that is accessible to various users through either a wired or wireless network connection (local area network (LAN); wide area network (WAN); etc.); or is physically accessible by being available at a public location, such as a shopping mall or a library. Alternatively, the custom electronic indices can be delivered to users on portable computer-readable media, such as magnetic-based memories, optical-based memories, electronic memories, etc.

Irrespective of how the custom electronic indices are made available to the users, the method controls the access to the computerized server in a manner that identifies a user as being within an identified target audience. In other words, the user who desires to access or obtain a custom electronic index is identified so that the user can be placed in a specific target audience and so that type of computerize portable device they will be using to access to the custom electronic index can be identified.

Once the user is identified, the method can then output to the user a corresponding custom electronic index that corresponds to the identified target audience. In addition, the method will make the corresponding custom electronic index compatible with the user's computerized portable device.

The custom electronic indices of the embodiments herein are much more useful than the generic electronic index, which only includes information from the hardcopy printed item, because the custom electronic indices provide the user with more information than the generic electronic index provides. For example, the generic electronic indices can include user annotations and graphics that are not included in the generic electronic index. Similarly, the custom electronic indices can include advertisements and hyperlinks not included in the generic electronic index.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Conventional indices for hardcopy items (even if the indices are in electronic form) are static items that do little more than provide specific reference to locations within the hardcopy item. Therefore, the embodiments herein utilize a system (shown in FIG. 1) and methodologies (shown in FIGS. 2-3) to create customized indices for hardcopy items that are much more flexible than generic indices, and that contain more information than generic indices.

Figure 1:
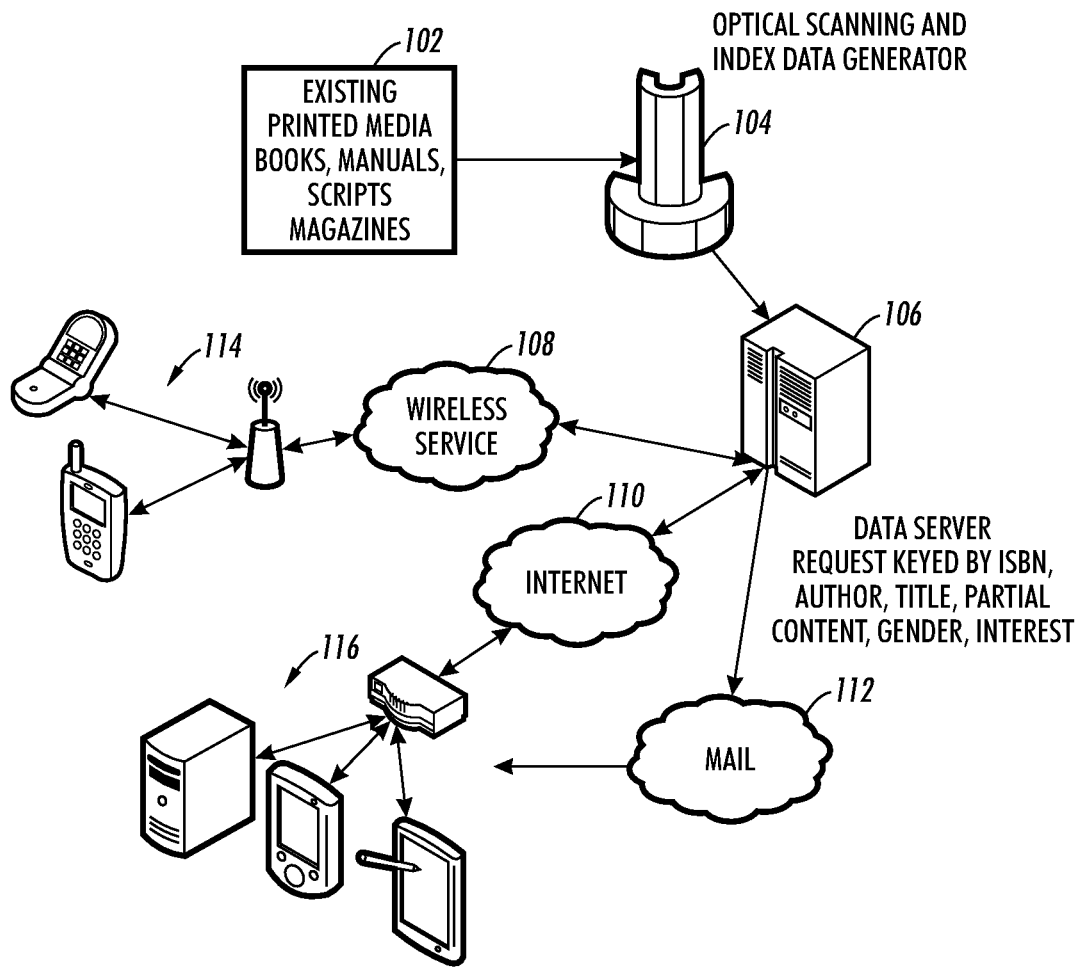
FIG. 1 is a schematic diagram of a system embodiment herein.

Referring to the system shown in FIG. 1, the embodiments herein create customized indices for hardcopy items 102 (hardbound books, paperback books, magazines, periodicals, etc.) that can be used with any computerized portable devices 114, 116 ranging from cell phones, personal digital assistants (PDAs), personal computers (PCs), or any form of computerized devices, etc. (even those adapted to be included with or attached to the hardbound copy). As shown in FIG. 1, the hardcopy items 102 may already be in electronic form, or they can be scanned using, for example, an optical scanner (index data generator) 104. Such information can be automatically recognized using, for example, an optical character recognition (OCR) software module. Thus, the electronic form of the generic index can be obtained, created, and/or supplied to a data server 106.

Figure 2:
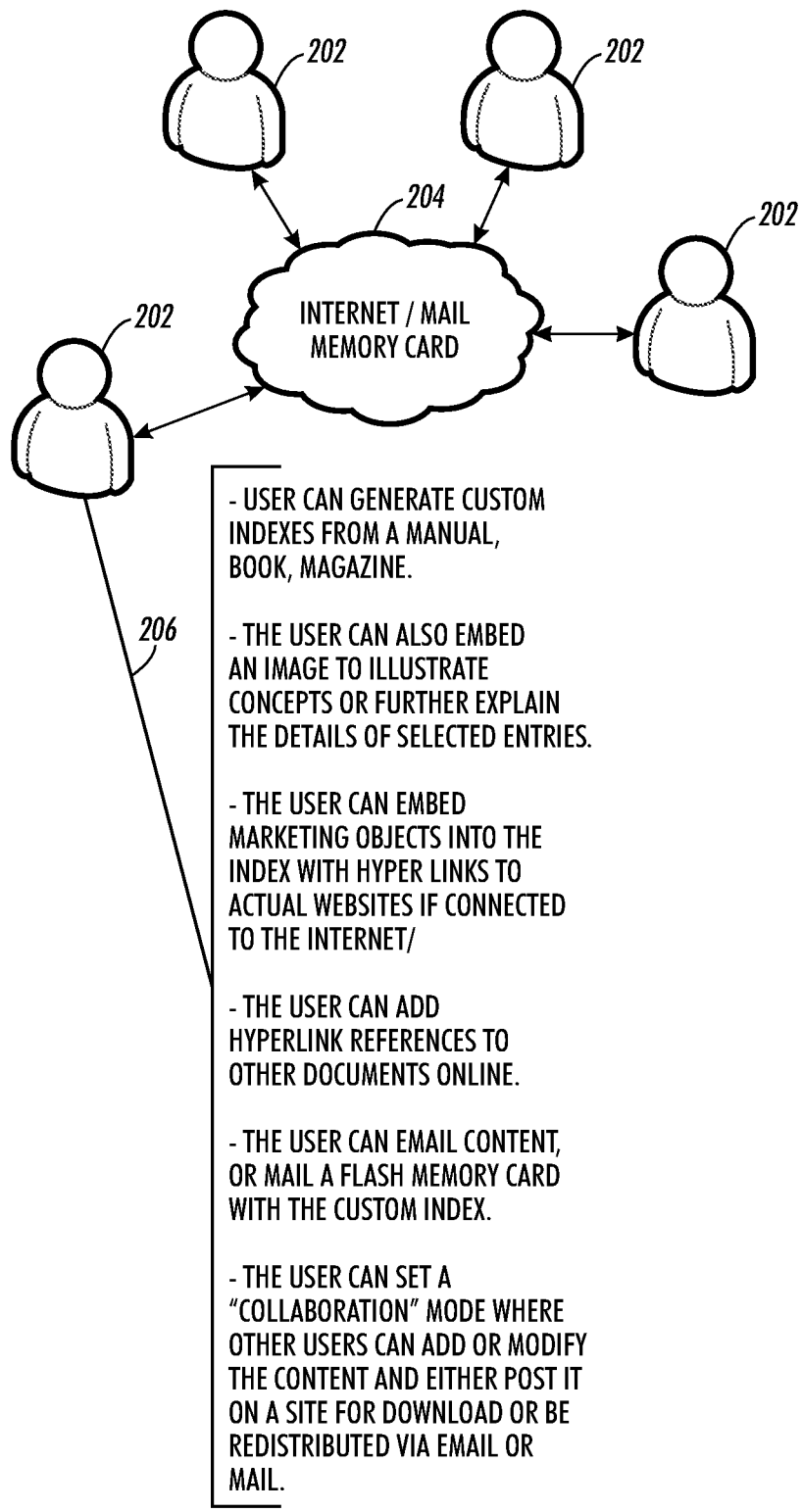
FIG. 2 is a schematic diagram of a system embodiment herein.
Figure 3:
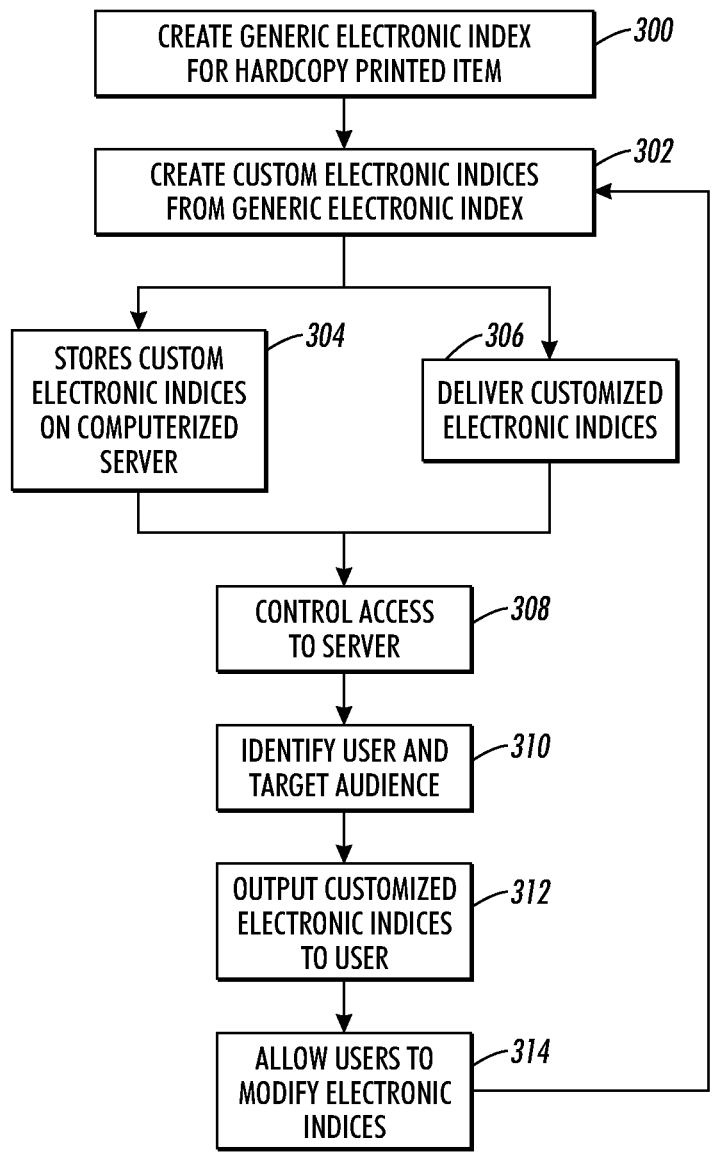
FIG. 3 is a flowchart illustrating method embodiments herein.

As shown in FIGS. 2 and 3, customized indices can be created from the generic index. Further, such customized indices within the data server 106 can answer to requests keyed by international standard book number (ISBN), author, title, partial content, gender, interest, etc. Such indices can be stored in files that only contain one or more indices and which are much smaller than files that would contain the entire text and graphics of the hardcopy document. Thus, the "index only" files herein are easy to store and transfer.

Thus, the embodiments herein use variable indexing configurations ranging from the book on hand to user defined indices (including indices for magazines and other hardcopy publications). This custom indexing can modify the custom indices to include embedded objects (e.g., pictures) illustrating concepts and other graphics (including marketing items and advertisements) and to include hyperlinks to other documents and websites. The custom indices generated expand from a book to any printed material. For instance in the case of a magazine, the accompanying custom electronic index can include graphical advertising and hyperlinks to various documents and web sites.

The customized indices within the data server 106 can be supplied to various computerized devices 114, 116 through wireless services 108; through a network 110 (e.g., a local area network (LAN) or wide area network (LAN), such as the Internet); or the customized indices can be placed on some form of media and delivered to the various computerized devices 114, 116, through any conventional delivery system 112, such as package delivery services, the mail, retail stores, etc.

Moreover, as shown in FIG. 2, the embodiments herein can expand custom indices (that may be accessible to users 202 via a network or memory card 204) based on user feedback/input 206. With embodiments herein, any user can create a collaboration environment where the custom electronic indices can be refined, appended, or corrected creating more efficient and a more complete source of information, in addition to the ability to embed objects. Any commonly available word processor or database software program can be utilized to create and save such custom electronic indices. Many such word processing and database software programs are available from manufacturers such as Microsoft Corp., Redmond Wash., USA and Apple Computer Company, Cupertino Calif., USA and the details of such software programs are not discussed herein.

Thus, as shown by item 206, any user can generate a custom index from any publication, such as a manual, a book, magazine, etc. The user can also embed an image into their custom index to illustrate concepts or further explain the details of selected entries. Further, with embodiments herein, the user can embed marketing objects into the index with hyperlinks to actual websites (if connected to the Internet). Similarly, the user can add hyperlink references to other documents online For example, with the embodiments herein, an automobile manufacturer can create a custom electronic index for an automobile owner's manual that includes annotations, hyperlinks, graphics, etc. that provide information of components that have been changed as a result of a specification change. Thus, this custom index could include links to a site where the changes are tracked for the customer.

As shown by item 204 in FIG. 2, each user 202 can share their custom indices with other users 202 by transferring such custom electronic indices over a wired or wireless network (e.g., the Internet) or by mailing or delivering recordable media (memory card, etc.) containing the custom indices to other users 202. Further, the embodiments herein allow the users 202 to engage in any collaboration mode where other users can add or modify the contents of the custom indices. For example, the custom indices can be posted on the server 106 and users who have rights to access the custom indices can make any desired changes thereto. The server 106 allows any of the users to download the modified custom indices according to their needs.

As shown in flowchart form in FIG. 3, one exemplary method embodiment herein begins at item 300, by creating or supplying a generic electronic index for a hardcopy printed item. The generic electronic index is based on the text within the hardcopy printed item. From this generic electronic index, the method creates a plurality of custom electronic indices from the generic electronic index, as shown in item 302. As mentioned above, such custom electronic indices can be based on user input and/or user feedback (as shown by the arrow from item 314) or can be created by marketing agencies, educational institutions, etc. Each of the custom electronic indices is a variant of the generic electronic index, and each of the custom electronic indices can be adapted to a different target audience.

After the custom electronic indices are created, in item 304, the method stores the custom electronic indices on the computerized server 106 that is accessible to various users through either a wired or wireless network connection (local area network (LAN); wide area network (WAN); etc.); or is physically accessible by being available at a public location, such as a shopping mall or a library. Alternatively, as shown in item 306, the custom electronic indices can be delivered to users on portable computer-readable media, such as magnetic-based memories, optical-based memories, electronic memories, etc.

Irrespective of how the custom electronic indices are made available to the users, the method controls the access to the computerized server (item 308) in a manner that identifies a user as being within an identified target audience (item 310). For example, the user may be required to logon with a password to the server 106 which would identify the association to which they belong, the school (or class) with which they are associated, or other information which would allow them to be classified within a specific target audience. Alternatively, the user can be automatically identified as being within a specific target demographic advertising group, based upon the item they purchase, their age, their address, their income bracket, etc.

Thus, the user who desires to access or obtain a custom electronic index is identified so that the user can be placed in a specific target audience (and/or so that the type of computerize portable device they will be using to access to the custom electronic index can be identified). By being placed within a specific target audience, the user can obtain (and/or modify) custom indices which they find especially useful (or which marketers, teachers, heads and associations, etc. desire the user to have).

Also, in the item 310, once the user is identified, the method can then output to the user a corresponding custom electronic index that corresponds to the identified target audience (item 312). Item 314 allows the user to alter the generic or custom indices to create new customized indices or to alter existing customized indices. In addition, the method will make the corresponding custom electronic index output compatible with the user's computerized portable device.

The custom electronic indices of the embodiments herein are much more useful than the generic electronic index, which only includes information from the hardcopy printed item, because the custom electronic indices provide the user with more information than the generic electronic index provides. For example, the generic electronic indices can include user annotations and graphics that are not included in the generic electronic index. Similarly, the custom electronic indices can include advertisements and hyperlinks not included in the generic electronic index.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Scanners, OCR programs, etc., are also widely available from manufactures such as Visioneer, Inc., Pleasanton, Calif., USA Such computerized devices commonly include input/output devices, power supplies, processors, electronic storage memories, wiring, etc., the details of which are omitted herefrom to allow the reader to focus on the salient aspects of the embodiments described herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A computer-implemented method comprising:
   supplying, using a computer, a generic electronic index for a hardcopy printed item comprising text, said generic electronic index comprising a detailed list of information included in said hardcopy printed item and being based on said text within said hardcopy printed item;
   creating, using said computer, a plurality of custom electronic indices from said generic electronic index, each of said custom electronic indices comprising a variant of said generic electronic index and including data not included in said generic electronic index, and each of said custom electronic indices being used by a different target audience of users, each of said users being classified into at least one of a plurality of different target audiences;
   storing said custom electronic indices on a computerized server;
   associating, using said computer, a computerized device with a user and classifying said user into an identified target audience based on a type of said computerized device;
   outputting to said user from said computer one of said custom electronic indices as a corresponding index that corresponds to said identified target audience of said user; and
   modifying said custom electronic indices based on user input.

2. The method according to claim 1, said custom electronic indices including user annotations not included in said generic electronic index.

3. The method according to claim 1, said custom electronic indices including advertisements not included in said generic electronic index.

4. The method according to claim 1, said custom electronic indices including hyperlinks not included in said generic electronic index.

5. The method according to claim 1, said custom electronic indices including graphics not included in said generic electronic index.

6. The method according to claim 1, said outputting comprising making said corresponding index compatible with said computerized device.

7. A computer-implemented method comprising:
   supplying, using a computer, a generic electronic index for a hardcopy printed item comprising text, said generic electronic index comprising a detailed list of information included in said hardcopy printed item and being based on said text within said hardcopy printed item;
   creating, using said computer, a plurality of custom electronic indices from said generic electronic index based on user input and user feedback, each of said custom electronic indices comprising a variant of said generic electronic index and including data not included in said generic electronic index, and each of said custom electronic indices being-used by a different target audience of users, each of said users being classified into at least one of a plurality of different target audiences;
   storing said custom electronic indices on a computerized server;
   associating, using said computer, a computerized device with a user and classifying said user into an identified target audience based on a type of said computerized device;
   outputting to said user from said computer one of said custom electronic indices as a corresponding index that corresponds to said identified target audience of said user; and
   modifying said custom electronic indices based on user input.

8. The method according to claim 7, said custom electronic indices including user annotations not included in said generic electronic index.

9. The method according to claim 7, said custom electronic indices including advertisements not included in said generic electronic index.

10. The method according to claim 7, said custom electronic indices including hyperlinks not included in said generic electronic index.

11. The method according to claim 7, said custom electronic indices including graphics not included in said generic electronic index.

12. The method according to claim 7, said outputting comprising making said corresponding index compatible with said computerized device.

13. A non-transitory computer-readable storage medium storing instructions that, when executed by a computer, cause the computer to perform a method comprising:
   supplying a generic electronic index for a hardcopy printed item comprising text, said generic electronic index comprising a detailed list of information included in said hardcopy printed item and being based on said text within said hardcopy printed item;

creating a plurality of custom electronic indices from said generic electronic index, each of said custom electronic indices comprising a variant of said generic electronic index and including data not included in said generic electronic index, and each of said custom electronic indices being used by a different target audience of users, each of said users being classified into at least one of a plurality of different target audiences;

storing said custom electronic indices on a computerized server;

associating, using said computer, a computerized device with a user and classifying said user into an identified target audience based on a type of said computerized device;

outputting to said user one of said custom electronic indices as a corresponding index that corresponds to said identified target audience of said user; and modifying said custom electronic indices based on user input.

14. The non-transitory computer-readable storage medium according to claim 13, said custom electronic indices including user annotations not included in said generic electronic index.

15. The non-transitory computer-readable storage medium according to claim 13, said custom electronic indices including advertisements not included in said generic electronic index.

16. The non-transitory computer-readable storage medium according to claim 13, said custom electronic indices including hyperlinks not included in said generic electronic index.

17. The non-transitory computer-readable storage medium according to claim 13, said custom electronic indices including graphics not included in said generic electronic index.

* * * * *